United States Patent [19]

Yamada et al.

[11] Patent Number: 4,647,854

[45] Date of Patent: Mar. 3, 1987

[54] APPARATUS FOR MEASURING THE LEVEL OF THE MOLTEN METAL IN THE MOLD OF A CONTINUOUS CASTING MACHINE

[75] Inventors: Takeo Yamada; Seigo Ando, both of Yokohama; Yoshihiro Kawase, Kawasaki, all of Japan

[73] Assignee: Nippon Kokan Kabushiki Kaisha, Tokyo, Japan

[21] Appl. No.: 648,266

[22] Filed: Sep. 7, 1984

[30] Foreign Application Priority Data

Sep. 9, 1983 [JP] Japan ................. 58-165045

[51] Int. Cl.⁴ ................. G01F 23/26; G01B 7/14; B22D 11/16
[52] U.S. Cl. ................. 324/207; 73/290 R; 164/449; 324/225
[58] Field of Search ................. 324/204, 207, 208, 225, 324/239-243; 164/150, 449; 73/290 R

[56] References Cited

U.S. PATENT DOCUMENTS 4,186,792 2/1980 Yamada et al. ................. 164/150

FOREIGN PATENT DOCUMENTS 57-192805 11/1982 Japan .

Primary Examiner—Gerard R. Strecker
Attorney, Agent, or Firm—Fleit, Jacobson, Cohn & Price

[57] ABSTRACT

An apparatus for measuring the level of molten metal in the oscillating mold of a continuous casting machine in operation by an eddy-current type distance measuring device. The oscillation signal component due to the oscillation of the mold is extracted from the output signal of the distance measuring device and the detection sensitivity of the distance measuring device is compensated and controlled so as to maintain the amplitude value of the oscillation signal component at a constant value thereby linearizing the molten metal surface level versus output characteristic.

4 Claims, 8 Drawing Figures

APPARATUS FOR MEASURING THE LEVEL OF THE MOLTEN METAL IN THE MOLD OF A CONTINUOUS CASTING MACHINE

BACKGROUND OF THE INVENTION

The present invention relates to molten metal level measuring apparatus for continuous casting machines and more particularly to a molten metal level measuring apparatus of the type which employs an eddy-current type distance measuring device for molten metal level measuring purposes.

It has been disclosed for example in U.S. Pat. No. 4,186,792 to measure the level of the molten metal in a mold and control the molten metal level at a constant level in the continuous casting of the metal. In this case, by measuring the level of the molten metal in the mold with greater accuracy and controlling the molten metal level at a constant level, it is possible to improve the quality of cast billets and therefore it is desirable to use a highly accurate mold metal level measuring apparatus.

A known mold metal level measuring apparatus of this type employing an eddy-current type distance measuring device is disclosed for example in Japanese Patent Laid-Open No. 57-192805. This eddy-current type distance measuring device includes a sensor coil having two coils which are wound and arranged one upon another on a vertically arranged hollow bobbin and the coils are connected differentially. Thus, the sensor coil is provided with a detection sensitivity only in its axial direction and the two coils function to cancel the effect of any electrically conductive member such as the mold wall located near to the sensor coil and the effect of temperature changes thereby accomplishing a distance measurement with greater accuracy.

However, in the case of the continuous measurement of the liquid level in the mold of a continuous casting machine in operation by using the eddy-current distance measuring device of the differential coil type, there still remain the following problems to be solved. More specically, while there will be no problem if the two coils of the sensor of the eddy-current distance measuring device are equally subjected to the electromagnetic effect of the mold inner wall, the sensor is in fact positioned in the upper part of the mold and therefore the lower coil undergoes the effect of the mold inner wall more than the upper coil. This tendency is increased as the sensor is located closer to the mold inner wall with the result that if particularly the cross-sectional area of the mold is small, the measurement error due to the difference in effect of the mold inner wall between the upper and lower coil is no longer negligible.

SUMMARY OF THE INVENTION

It is a primary object of the present invention to provide an apparatus for measuring the level of the molten metal in the mold of a continuous casting machine in operation by using an eddy-current distance measuring device including a sensor coil having differential coils which is so designed that if particularly there is a difference in electromagnetic effect of the mold inner wall between the upper and lower coils of the sensor coil, any measurement error due to the difference is eliminated.

It is another object of the invention to provide such measuring apparatus capable of measuring the level of molten metal with greater accuracy even in a continuous casting machine using a mold of such a small cross-sectional area that the sensor coil is inevitably positioned in the upper part of the mold close to the mold inner wall.

To accomplish these objects, in accordance with one form of the invention there is thus provided an apparatus for measuring the level of the molten metal in the mold of a continuous casting machine which is oscillated with a predetermined amplitude and period in accordance with the measurement of the separation distance between the molten metal surface and the detecting head of an eddy-current type distance measuring device arranged toward the molten metal surface within tne mold. The apparatus features that the eddy-current type distance measuring device comprises an oscillator for generating an ac signal having a predetermined frequency and a fixed amplitude, a feedback amplifier for amplifying the ac signal from the detecting head that includes a pair of eddy-current detecting coils connected in the positive feedback loop of the feedback amplifier and an excitation coil excited by the ac signal. The apparatus also features mechanical means for transmitting the oscillation of the mold to the detecting head, signal separating means for separating the output of the feedback amplifier into an oscillation component corresponding to the oscillation period of the mold and a distance measurement component other than the oscillation component, and circuit means for controlling the amplification degree of the feedback amplifier such that the amplitude value of the oscillation component is maintained at a predetermined reference value.

In other words, the present invention has been made by noting the fact that the mold is oscillated with a predetermined period and amplitude during tne continuous casting operation and it is designed so that the detecting head is mechanically mounted on the mold proper or the mold cover whereby during the molten metal level measurement a signal corresponding to the oscilation of the mold is detected simultaneously and also the detection sensitivity of the eddy-current type distance measuring device is compensated so as to always maintain the amplitude of the oscillation signal at a predetermined value thereby linearizing the output characteristic with respect to the molten metal level.

In accordance with an embodiment of the invention, the mechanical means is a mounting structure for fixedly mounting the detecting head on the mold proper or the mold cover and it comprises a metal fixture or heat insulating supporting member. Also, in accordance with another embodiment of the invention, the signal separating means includes a detector for detecting the amplitude value of tne oscillation component after its extraction. Also, in accordance with still another embodiment of the invention, the circuit means includes difference detecting means for detecting the deviation of the amplitude value of the oscillation component from the reference value and feedback controlling circuit means for controlling the positive feedback ratio of the feedback amplifier so as to reduce the deviation to zero.

The above and other objects as well as advantageous features of the invention will become more clear from the following description taken in conjunction with the drawings.

DETAILED DESCRIPTION OF THE PREFERRED EMBODIMENTS

Before describing the embodiments of this invention, a description will be made of a case where the high accuracy eddy-current type distance measuring device of the differential coil type shown in the previously mentioned Japanese Patent Laid-Open No. 57-192805 is simply used with the mold molten metal level measuring apparatus for continuous casting machines with a view to facilitating the understanding of the feature of this invention. However, it should be borne in mind that the eddy-current type distance measuring device used with the invention is not limited to this differential coil type.

Figure 1:
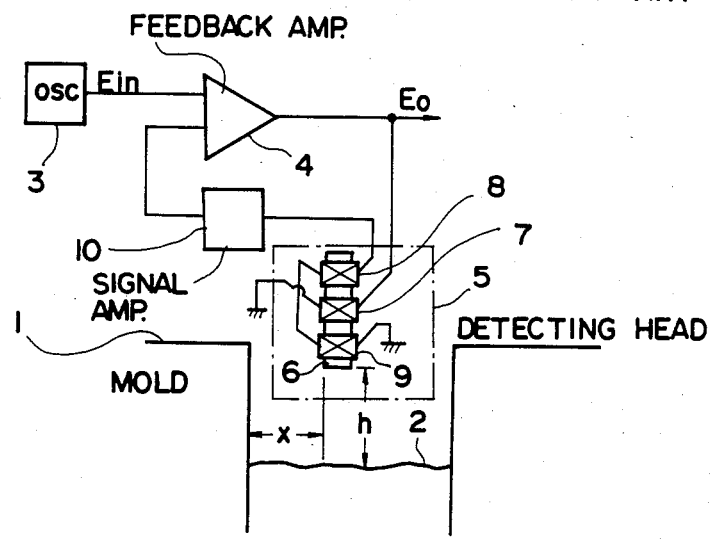
FIG. 1 is a block diagram of a prior art mold molten metal level measuring apparatus of the eddy-current type.

FIG. 1 is a block diagram showing the basic construction of a mold molten metal level measuring apparatus for continuous casting machines employing the eddy-current type distance measuring device according to the Japanese Patent Laid-Open No. 57-192805. In the Figure, numeral 1 designates a mold, 2 the surface level of the molten metal in tne mold, 3 an oscillator, 4 a feedback amplifier, and 5 a detecting head including a coil bobbin 6, a primary coil 7 and a pair of secondary coils 8 and 9. The pair of secondary coils are differentially connected in series with each other. Numeral 10 designates a signal amplifier.

With this mold molten metal level measuring apparatus, the detecting head 5 is positioned above the molten metal surface 2 within the mold 1 so that when an ac current having a predetermined amplitude and frequency is supplied to the primary coil 7 from the oscillator 3 through the feedback amplifier 4, the primary coil 7 generates an ac field and this ac field passes through the molten metal thus producing eddy currents in the molten metal surface. The production of the eddy currents causes a reaction in which an ac field of the opposite polarity to that of the primary coil 7 is produced and the magnetic flux passing tnrough the secondary coils 8 and 9 is decreased.

The pair of secondary coils 8 and 9 undergo the effect of this reaction and their induced voltages are varied. The secondary coil 9 close to the molten metal surface 2 is subjected to this effect to a greater extent and consequently the relation between the induced voltage $V_{s1}$ of the secondary coil 8 and the induced voltage $V_{s2}$ of the secondary coil 9 results in $V_{s1} > V_{s2}$. Since the secondary coils 8 and 9 are connected opposite in phase with each other, the difference $V_s = (V_{s1} - V_{s2})$ of the induced voltage in the secondary coils 8 and 9 is extracted. This difference signal voltage $V_s$ is positively fed back to the input of the feedback amplifier 4 through the signal amplifier 10 (the amplification degree is not necessarily needed).

Since the value of the difference $V_s = V_{s1} - V_{s2}$ between the induced voltages in the pair of secondary coils 8 and 9 is varied in accordance with the relative distance h of the bobbin 6 having wound thereon the primary coil 7 and the pair of secondary coils 8 and 9 and the molten metal surface 2, the positive feedback ratio of the feedback amplifier 4 is varied and hence the output of the amplifier 4 is varied.

In other words, the output of the feedback amplifier is given by the following equation (1).

$$E_o = \frac{G_1 \cdot E_{in}}{1 - G_1 \cdot G_2 \cdot f(h)}$$

where
- $E_{in}$ = the output voltage of the oscillator 3 (the input voltage to the feedback amplifier 4)
- $E_o$ = the output voltage of the feedback amplifier 4
- $G_1$ = the open amplification degree of the feedback amplifier 4
- $G_2$ = the amplification degree of the signal amplifier 10
- f(h) = the function determined by the relative distance of the detecting head 5 and the molten metal surface level 2
- $f(h) = V_s/E_o$ Thus, as will be seen from the equation (1), if the values of $G_1$, $G_2$ and $E_{in}$ are fixed, the value of the output voltage $E_o$ is varied in accordance with the relative distance h of the detecting head 5 and the molten metal surface 2 and thus the measurement of this value results in the measurement of the level of the molten metal surface 2.

Figure 2:
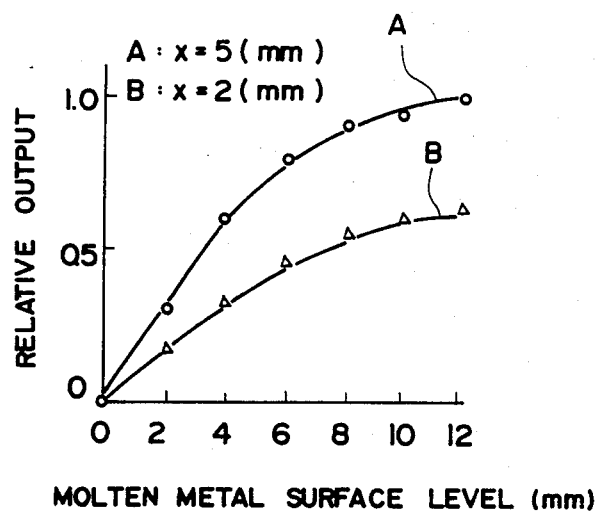
FIG. 2 is an output characteristic diagram of the apparatus shown in FIG. 1.

FIG. 2 shows an example of the output characteristic diagram of the mold molten metal level measuring apparatus of FIG. 1. As shown in the Figure, if the value of the relative distance x of the side wall of the mold 1 and the detecting head 5 is varied from 5 mm to 2 mm, the output voltage for the same molten metal level h is varied and the measurement accuracy is deteriorated extremely.

The reason is that since the detecting head 5 is near to the mold 1 from above, the ac field produced by the primary coil 7 of the detecting head 5 also passes through the side wall of the mold 1 so that eddy currents are also produced in tne mold side wall and the lower secondary coil 9 close to the mold 1 is subjected to the effect of this reaction to a greater degree than the upper secondary coil 8 remote from the upper surface of the mold 1. This unbalance between the secondary coils 8 and 9 with respect to the effect of the eddy currents flowing to the mold side wall becomes more prominent with a decrease in the relative distance x of the detecting head 5 and the mold side wall and therefore the measuring accuracy of the molten metal surface level is deteriorated in the case of the mold 1 whose cross-sectional area is so small that the relative distance x is inevitably reduced.

Now noting the oscillation of the predetermined period and amplitude imparted to the mold during the operation of the continuous casting machine, if the detecting head 5 is fixedly mounted on the mold 1, this oscillation can be extracted as the oscillation of the molten metal surface 2 or the oscillation component from the output of the feedback amplifier 4 and this oscillation component is referred to as an oscillation signal.

Figure 3A:
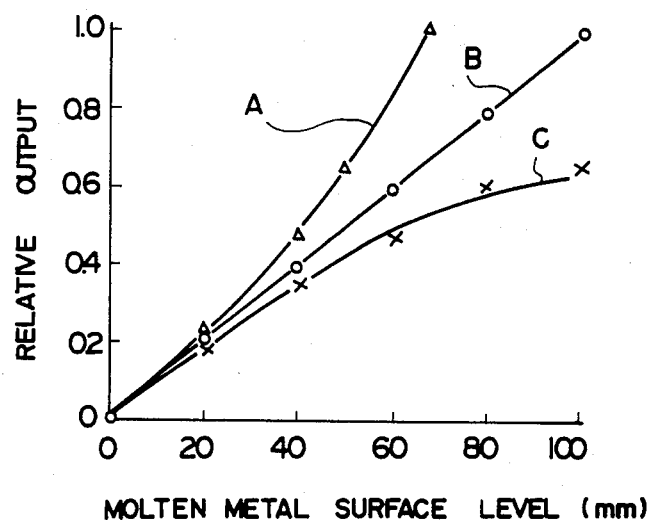
FIGS. 3A and 3B are respectively an output characteristic diagram and an oscillation signal amplitude characteristic diagram of the prior art mold molten metal level measuring apparatus of the eddy-current type.
Figure 3B:
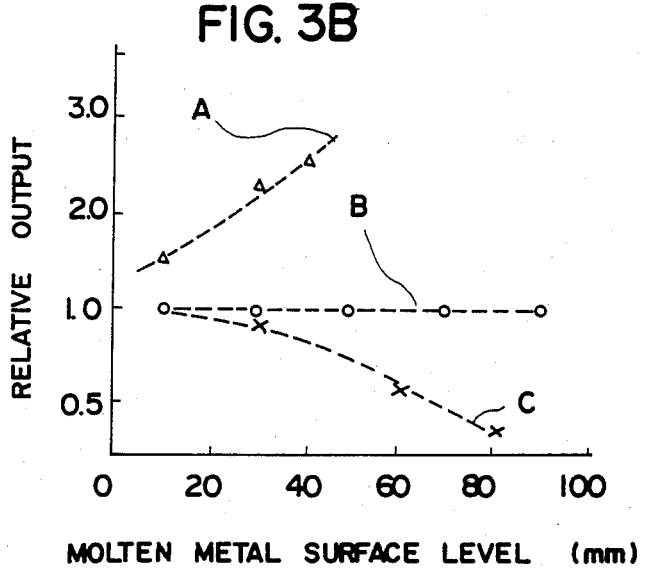

FIGS. 3A and 3B are characteristic diagrams showing respectively the molten metal surface level versus output characteristics and the correlation between the output characteristics and the amplitude of the oscillation signal. When the output characteristic is linear with the molten metal surface level (the curve B in FIG. 3A), the amplitude of the oscillation signal is constant (1.0) (the curve B in FIG. 3B) irrespective of the molten metal surface level. In contrast to this characteristic, the amplitude of the oscillation signal shows the characteristic A or C of FIG. 3B in response to the output characteristic A or C of FIG. 3A. It will be seen from the fact that by adjusting the detection sensitivity so as to maintain the amplitude of the oscillation signal constant, it is possible to linearize the molten metal surface level versus output characteristic.

Next, eddy-current type molten metal level measuring apparatus according to the embodiments of the invention will now be described.

Figure 4:
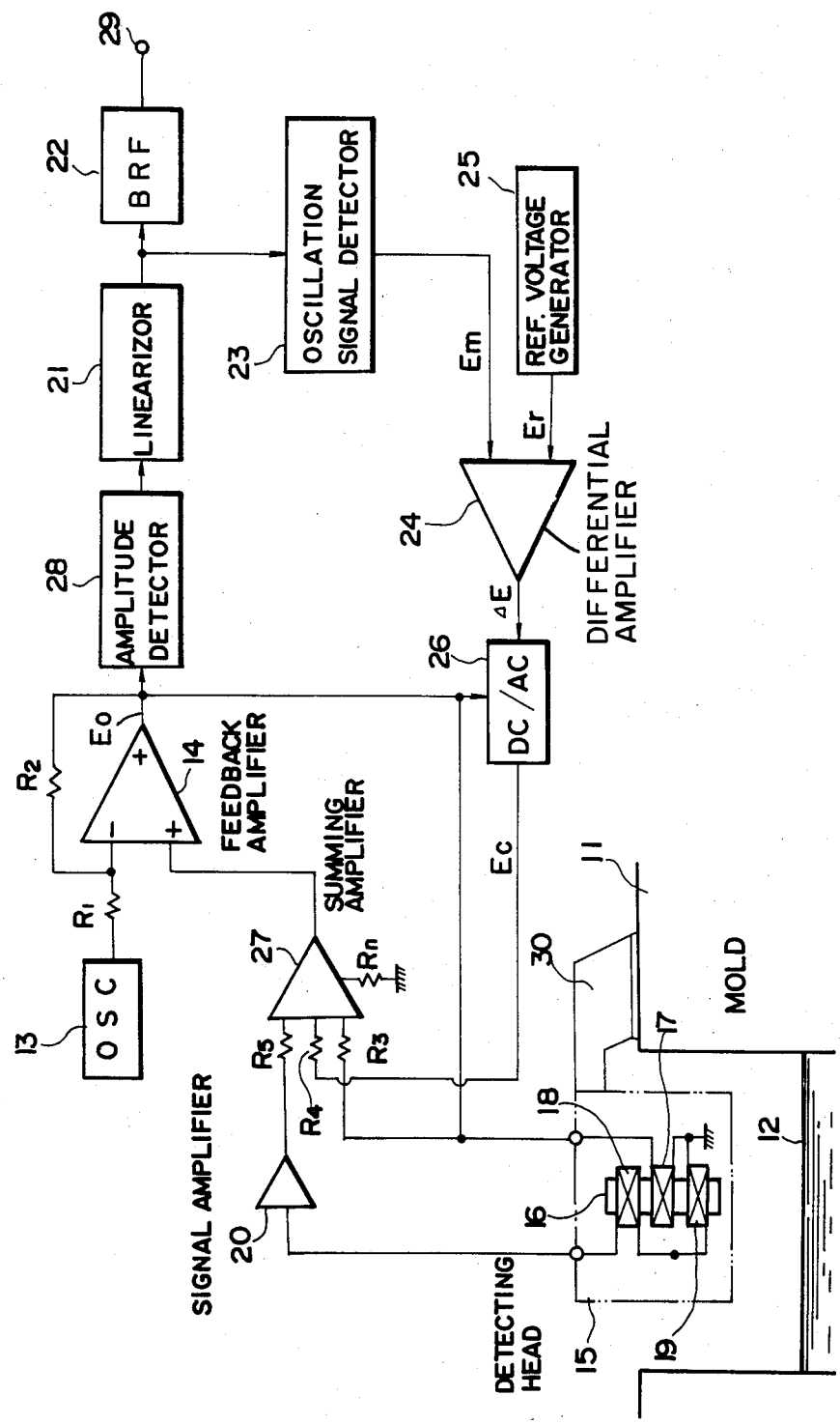
FIG. 4 is a block diagram of a mold molten metal level measuring apparatus of the eddy-current type according to an embodiment of the invention.

FIG. 4 is a block diagram of the eddy-current type mold molten metal level measuring apparatus according to the first embodiment of the invention.

In the Figure, a detecting head 15 is fixed in position in the upper part of a mold 11 of a continuous casting machine by a mounting support 30 so as to provide a distance to be measured between the head 15 and a molten metal surface 12 in the mold 11 and the oscillation of the mold 11 is transmitted directly to the detecting head 15. The detecting head 15 includes a single cylindrical bobbin 16, a primary coil 17 wound on substantially the central portion of the bobbin 16 and a pair of secondary coils 18 and 19 respectively wound on the upper and lower sides of the primary coil 17 on the bobbin 16. The pair of secondary coils 18 and 19 are connected in such a manner that they have the same number of turns and are wound in the opposite directions thereby forming differential coils. An oscillator 13 generates an ac signal having a predetermined amplitude and frequency and supplies this ac signal to the negative input terminal of feedback amplifier 14 through a resistor $R_1$. A negative feedback resistor $R_2$ is connected between the output terminal and negative input terminal of the feedback amplifier 14 and the amplified ac signal output generated at the output terminal is supplied to the primary coil 17 of the detecting head 15 thereby exciting the primary coil 17. The detection signal from the secondary coils 18 and 19 is applied to the positive input terminals of the feedback amplifier 14 through a signal amplifier 20 and a summing amplifier 27 and these elements form a first Positive feedback loop. The summing amplifier 27 also includes two separate input circuits and one of the input circuits forms a second positive feedback loop for positively feeding a portion of the output of the feedback amplifier 14 back to the positive input terminal of the feedback amplifier 14. A third positive feedback loop of the amplifier 14 by way of the summing amplifier 27 is formed by an oscillation signal feedback circuit which will be described hereunder. Specifically, in FIG. 4, an amplitude detector 28 is connected to the output terminal of the feedback amplifier 14 and the output terminal of, the amplitude detector 28 is connected to a band rejection filter 22 and an oscillation signal detector 23 through a linearizor 21 which is provided as occasion demands. The oscillation signal detector 23 includes for example a high-pass filter and a detection circuit so that the oscillation signal component due to the oscillation of the mold 11 is extracted from the output signal of the amplitude detector 28 and a voltage signal Em corresponding to the amplitude value of the oscillation component is generated. The voltage signal Em is applied to one input terminal of a differential amplifier so as to generate a difference $\Delta E$ between the voltage signal Em and a reference voltage Er applied from a reference voltage generator 25 to the other input terminal of the differential amplifier 24. The difference signal $\Delta E = Er - Em$ generated from the differential amplifier 24 is a dc signal so that the difference signal $\Delta E$ is converted to an ac voltage signal by a DC/AC converter 26 and it is then positively fed back to the positive input terminal of the feedback amplifier 14 through the summing amplifier 27. This third feedback loop forms a feedback ratio control circuit for controlling the positive feedback ratio of the feedback amplifier 14 so as to always maintain the difference signal $\Delta E$ at zero.

The band rejection filter 22 blocks the oscillation signal component in the output of the amplitude detector 28 and the output signal excluding the oscillation component is generated at an output terminal 29.

The operation of the embodiment of FIG. 4 will now be described.

When the detecting head 15 is fixedly mounted on the mold 11 and the level of the molten metal surface 12 in the mold 11 is measured, the feedback amplifier 14 generates an output voltage $E_o$ which is a composite signal of an output $E_h$ corresponding to the molten metal surface level and an oscillation signal Emsinwt due to the mold oscillation. The composite signal output voltage is subjected to amplitude detection by the amplitude detector 28 and then applied to the linearizor 21 where it is compensated so as to provide an output voltage characteristic proportional to the molten metal surface level. The output voltage of the linearizor 21 is applied to the band rejection filter 22 so that the passage of the oscillation signal Emsinwt is blocked and only the molten metal surface signal Eh is delivered to the output terminal 29. The signal Eh is then measured by an indicator or recorder which is not shown.

Also, the output voltage of the linearizor 21 is applied to the oscillation signal detector 23 which in turn generates an output voltage Em proportional to the amplitude of the oscillation signal. This output signal is applied to the differential amplifier 24 and compared with the reference voltage Er from the reference voltage generator 25. The resulting difference voltage is applied to the DC/AC converter 26 of the servomotor or solid-state type. The output voltage $E_o$ of the feedback amplifier 14 is also applied to the DC/AC converter 26 and converted to an ac voltage corresponding to the magnitude and polarity of the output voltage from the differential amplifier 24. The output voltage Ec of the DC/AC converter 26 is fed back to the feedback amplifier 14 through the summing amplifier 27 and the amplification degree of the feedback amplifier 14 is controlled so as to reduce the output voltage $\Delta E$ of the differential amplifier 24 to zero. At this time, as in the case of FIG. 1, the output of the feedback amplifier 14 is supplied to the primary coil 17 of the detecting head 15 and the output from the secondary coils 18 and 19 is supplied to the signal amplifier 20.

In this case, the output voltage $E_o$ of the feedback amplifier 14 due to the above-mentioned positive feedback circuits and the negative feedback circuit formed by the resistors $R_1$ and $R_2$ is given by the following equation (2).

$$E_o = \frac{N \cdot Ein}{1 - (1+N)\left[\dfrac{R_n}{R_3} + \dfrac{R_n}{R_4}K + G_2 \cdot \dfrac{R_n}{R_5}f(h)\right]}$$

where

Ein = the input voltage of the feedback amplifier 14

N = the amplification degree ($N = R_2/R_1$) of the feedback amplifier 14 as an inverting amplifier.

$G_2$ = the amplification degree of the signal amplifier 20.

$f(h)$ = the variable determined by the relative distance of the detecting head 15 and the mold molten metal surface 2

$R_n$, $R_3$, $R_4$, $R_5$ = the summing constant resistors of the summing amplifier 27

K = the variable determined by the amplitude value of the oscillation signal, which is reduced to zero when the output voltage of the oscillation signal detector 23 is equal to the reference voltage of the reference voltage generator 25.

With the above equation (2), when the output voltage of the oscillation signal detector 23 is equal to the reference voltage of the reference voltage generator 25, tne value of K is reduced to zero and no control is effected with respect to the output voltage of the feedback amplifier 14. On tne other hand, when the amplitude of the oscillation signal takes the form of the characteristic shown by A or C in FIG. 3B, the value of K is varied so that the amplification degree of the feedback amplifier 14 is adjusted and a compensation is provided to linearize the molten metal surface versus output characteristic.

Thus, in accordance with the above-mentioned embodiment, irrespective of the molten metal surface, it is possible, at any given molten metal surface level, to adjust the amplification degree of the feedback amplifier 14 and thereby automatically calibrate the mold molten metal level measuring apparatus.

Figure 5A:
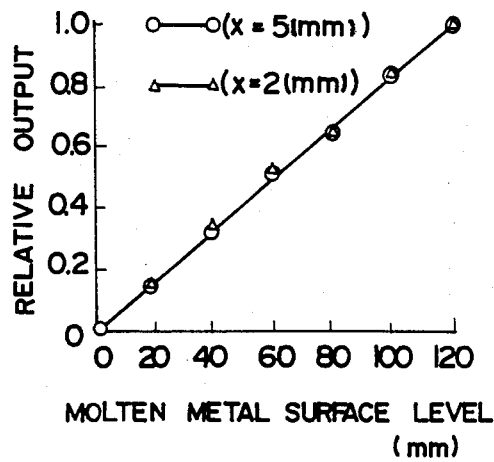
FIGS. 5A and 5B are respectively an output characterristic diagram and an oscillation signal amplitude characteristic diagram of the embodiment shown in FIG. 4.
Figure 5B:
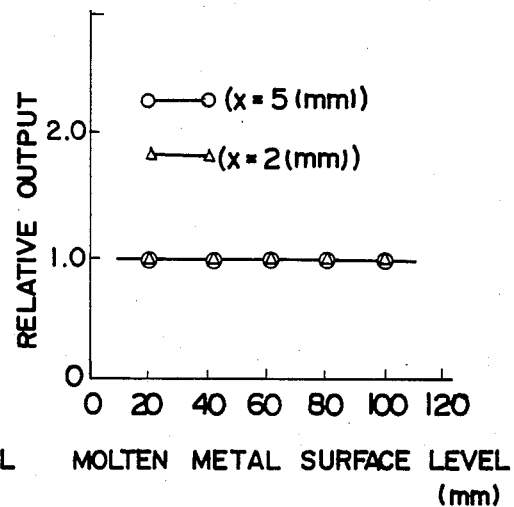

FIGS. 5A and 5B show the characteristic diagrams obtained in the case where the mold molten metal level measuring apparatus of the above-mentioned embodiment is applied to a billet continuous casting machine, and FIG. 5A shows the output characteristics respectively corresponding to the cases where the relative distances x of the detecting head 15 and the mold side wall are 5 mm and 2 mm. As will be seen from the Figure, the two relative outputs are substantially the same and the complete linear characteristics are obtained. On the other hand, FIG. 5B shows the corresponding oscillation signal amplitude characteristic diagrams showing that the amplitude of the signal is maintained at a predetermined value irrespective of the value of the molten metal surface value and the present mold molten metal level measuring apparatus functions properly.

Figure 6:
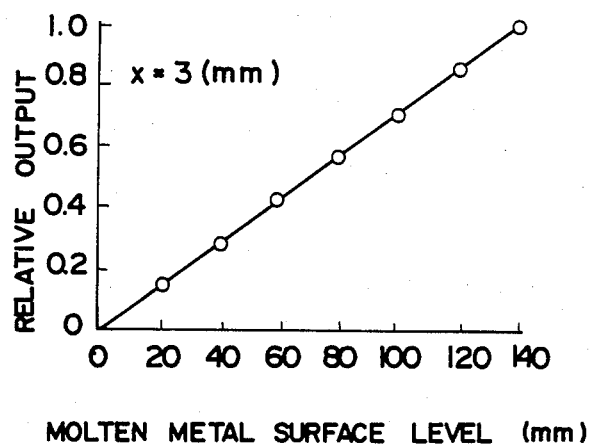
FIG. 6 is an output characteristic diagram of an eddy-current type mold molten metal level measuring apparatus according to another embodiment of the invention.

While the embodiment of FIG. 4 includes the linearizor 21, it is possible to extract the oscillation signal from the output voltage of the amplitude detector 28 and control the amplification degree of the feedback amplifier 14 in the same manner as mentioned previously thereby providing a simple automatic linearizor and eliminating the linearizor 21. The corresponding output characteristic is shown in FIG. 6.

As will be seen from the foregoing description, the eddy-current type mold molten metal level measuring apparatus according to the invention has the following effects.

(1) Since the amplitude of the oscillation signal is measured and the amplification degree of the feedback amplifier is adjusted so as to maintain the amplitude at a predetermined value, the molten metal surface level versus output characteristic always takes the form of a linear characteristic.

(2) Even if the relative positions of the detecting head and the mold are changed, the level of the molten metal surface can be measured with a high degree of accuracy.

(3) Since a compensation is automatically provided for the effect of the mold side wall and the level of the molten metal surface is measured witn a high degree of accuracy, the apparatus is applicable to a case where tne width of continuously cast slabs is cnanged automatically.

We claim:

1. In an apparatus for measuring the level of molten metal in a mold of a continuous casting machine which mold is oscillated with a predetermined amplitude in accordance with the result of measurement of a separation distance between the molten metal surface and a detecting head of an eddy-current type distance measuring device arranged toward the molten metal surface in the mold, wherein said eddy-current type distance measuring device is equipped with an oscillator for generating an ac signal having a predetermined frequency and a fixed amplitude, a feedback amplifier for amplifying the ac signal and said detecting head connected in a positive feedback loop of the feedback amplifier, which detecting head has eddy-current detecting coils producing a detecting signal for said positive feedback loop and an excitation coil excited by the amplified ac signal, the improvement comprising:

mechanical means for transmitting the oscillation of said mold to said detecting head by fixing the detecting head to the mold;

signal separating means for separating the output of said feedback amplifier into an oscillation component corresponding to the oscillation period of said mold and a distance measurement component for measuring the level of molten metal other than said oscillation component; and circuit means for controlling the amplification degree of said feedback amplifier based upon a difference between the amplitude value of said oscillation coponent and a predetermined reference valve, that is applied to said feedback amplifier as positive feedback value in addition to said detecting signal from said detecting head in order to maintain the amplitude value of said oscillation component at a predetermined reference value.

2. An apparatus according to claim 1, wherein said detecting head is mechanically attached to said mold.

3. An apparatus according to claim 1, wherein said signal separating means includes a detector for detecting the amplitude value of said oscillation component.

4. An apparatus according to claim 1, wnerein said circuit means includes difference detecting means for detecting the difference between the amplitude value of said oscillation component and said reference value, and feedback controlling circuit means for controlling a positive feedback ratio of said feedback amplifier so as to reduce said difference to zero.

* * * * *